United States Patent [19]
Wehrmann

[11] 3,818,205
[45] June 18, 1974

[54] COMPUTATIONAL CIRCUIT FOR MATHEMATICAL OR PHYSICAL VALUES IN ELECTRICAL FORM

[75] Inventor: Wolfgang Wehrmann, Vienna, Austria

[73] Assignee: Norma Masstechnik Gesellschaft m.b.h., Vienna, Austria

[22] Filed: July 31, 1972

[21] Appl. No.: 276,315

[30] Foreign Application Priority Data
Aug. 3, 1971 Austria .............................. 6778/71

[52] U.S. Cl. ............... 235/193, 235/194, 235/193.5
[51] Int. Cl. .......................... G06g 7/16, G06g 7/20
[58] Field of Search ........... 235/193, 194, 195, 196, 235/193.5; 340/347 A–347 D; 307/231, 234, 235, 261, 265; 328/160, 161, 146

[56] References Cited
UNITED STATES PATENTS

| | | | |
|---|---|---|---|
| 3,278,737 | 10/1966 | Germain | 235/196 |
| 3,358,129 | 12/1967 | Schultz | 235/194 |
| 3,521,038 | 7/1970 | Gilbert | 235/194 X |
| 3,536,904 | 10/1970 | Jordan, Jr. et al. | 235/194 |
| 3,648,182 | 3/1972 | Carnel | 235/194 X |

*Primary Examiner*—Joseph F. Ruggiero
*Attorney, Agent, or Firm*—Cushman, Darby & Cushman

[57] ABSTRACT

Circuit arrangements for carrying out mathematical operations upon electrical signals by means of pulse sequences, the frequencies of which are proportional to desired computational results. Threshold-controlled comparison and decision units are provided for comparing the physical or electrical magitudes with output signals generated by associated threshold signal generators. The threshold-controlled comparison and decision units produce at their outputs logic 0 or 1 decisions. The threshold signal generators have output signals of predetermined relative amplitude frequencies. The outputs of the comparison and decision units are coupled to the inputs of a computationally adaptive configuration network, which includes a storage capability. The computationally adaptive configuration network transforms or configures the logic 0 or 1 sequences of the comparison and decision units to a resulting 0 or 1 sequence forming the output of the configuration network, and the relative pulse or pulse duration frequency of which is proportional to the computational result. The computational result output of the computationally adaptive configuration network can be connected to an output unit for displaying the computational results in analogue or digital form. In various embodiments of the invention computationally adaptive configuration networks are disclosed for performing multiplications, divisions, taking of roots and placing exponentaials, performing mathematical transforms on signals, and performing addition and subtraction.

44 Claims, 41 Drawing Figures

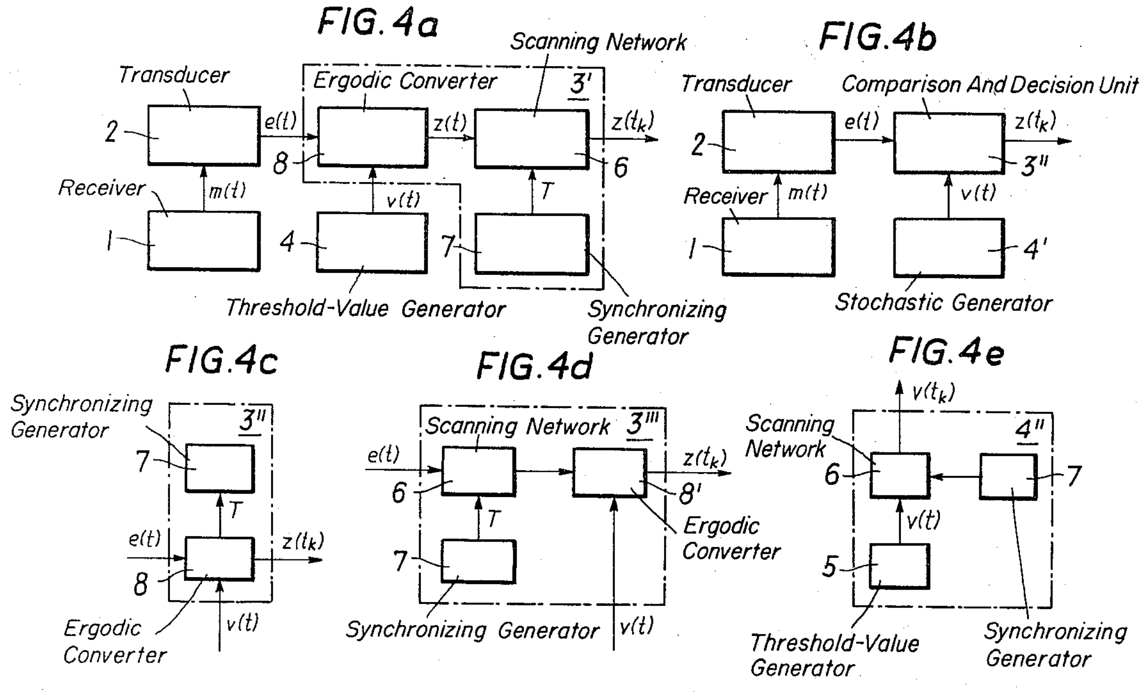
FIG. 4a, FIG. 4b, FIG. 4c, FIG. 4d, FIG. 4e
FIG. 5a
FIG. 5b
FIG. 5c
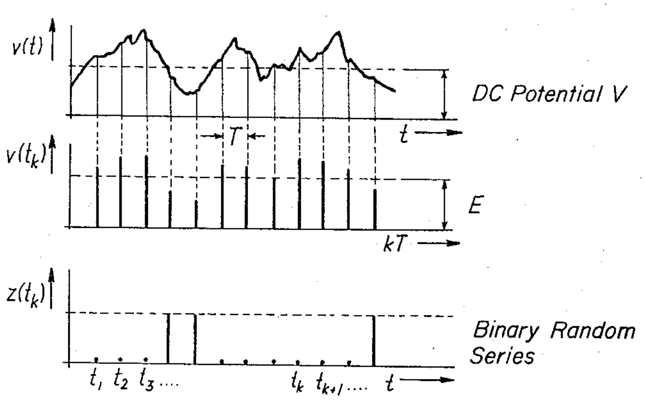
FIG. 6
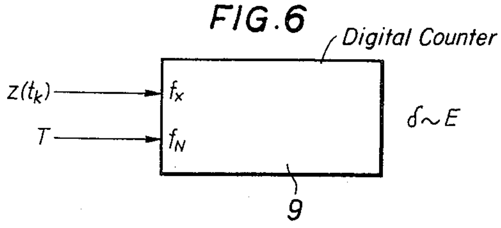

COMPUTATIONAL CIRCUIT FOR MATHEMATICAL OR PHYSICAL VALUES IN ELECTRICAL FORM

The invention concerns a circuit arrangement for carrying out mathematical operations for mathematical or physical values or signals transduced into electrical magnitudes or signals by means of pulse sequences the frequencies of which are proportional to the computational results.

Systems for carrying out computational operations of mathematical or physical magnitudes or signals in electrical form by means of pulse suequences are known in contemporary computational knowledge. They are the foundations of the electronic data processing (EDP) techniques and are described in many variations in the patent literature.

In principle, the tasks consist in representing analog or digital data in the form of two-valued functions and to relate them according to the mathematical operation which is prescribed. Various binary codes are used in this respect. Several typical ones are the BCD code, the one-ex-N-code, the PCM code, the Aiken code and the excess three code. With respect to the two-valued functional form according to this invention, the codes coming under the state-of-the art suffer from four essential drawbacks. First computers specifically designed for a given code are fairly expensive, second they are vulnerable to interferences, third the devices for converting computational results into the decimal system are very costly and fourth synchronization of the coded signals must be ensured to high accuracy.

The invention aims to avoid the drawbacks of the conventional binary code and to achieve mathematical computations in a novel and advantageous manner. Essentially the invention consists in a circuit arrangement as initially mentioned being provided with threshold-controlled comparison and decision units and with associated threshold value generators, with a computationally adaptive storage combining network and with output units, where the threshold value generators are provided with output potentials of specified amplitude frequencies, where binary pulse sequences occur at the output of the connection network in which the pulse frequencies or the pulsé length frequencies are proportional to the computational results, and where the output units render these computational results in digital or analog form.

BRIEF DESCRIPTION OF THE DRAWING

The drawing illustrates the invention by means of diagrammatic embodiments. Shown are: a block diagram in FIG. 1*a* of a switching arrangement according to the invention's principles; a particularly simple arrangement for the output of computed values in analogue form in FIG. 1*b;* the signal time-curves corresponding to FIG. 1*a* in FIGS. 2*a* and 2*b;* further signal time-curves in FIGS. 3*a* through 3*d* for the explanation of the circuit's operation; further embodiments or variations of the circuit of FIG. 1*a* in FIGS. 4*a* through 4*e* are diagrams explaining signal processing by means of these arrangements in FIGS. 5*a* through 5*c;* an additional measurement device for digital output of the computed value in FIG. 6; a combination of two circuit arrangements according to FIG. 4*b* into a computational circuit emitting a binary random series with a pulse event with a relative frequency in FIG. 7*a*, the frequency being proportional to the linear mean value of the product of two signals, and in FIGS. 7*b* through 7*e*, variations thereof; a circuit arrangement for computing roots from mean-time values in FIG. 8*a* and a variation of part of this circuit in FIG. 8*b;* a switching circuit for forming quotients of mean time values in FIG. 9; a circuit for computing correlation coefficients in FIG. 10; circuits for computing the mean value of the absolute amount, of the so-called DC value, in FIGS. 11*a* and 11*b*, and the associated diagrams explaining signal processing in FIGS. 12*a* through 12*d;* a circuit for signal functional transformation in FIG. 13; a circuit for addition in FIG. 14*a* and one for subtracting of two magnitudes in FIG. 14*b;* an arrangement of plurality of AND gates by means of which addition and subtraction may be carried out for an arbitrary number of computational values, — the circuit's modulation range being invariant with respect to the number of operators — in FIG. 15; the previously mentioned circuits' storages and their controls in FIGS. 16*a* through 16*e*.

DESCRIPTION OF THE PREFERRED EMBODIMENTS

Figure 1A:
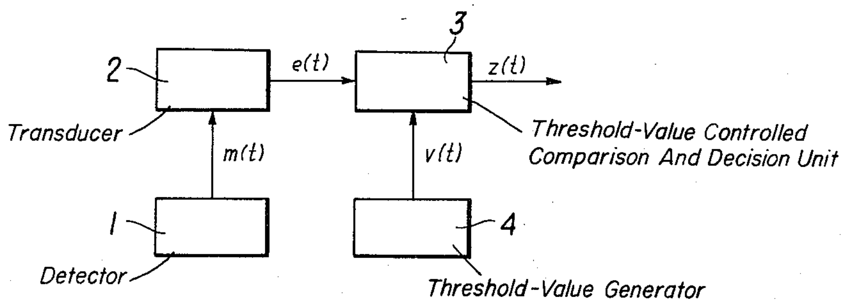
Figure 2A:
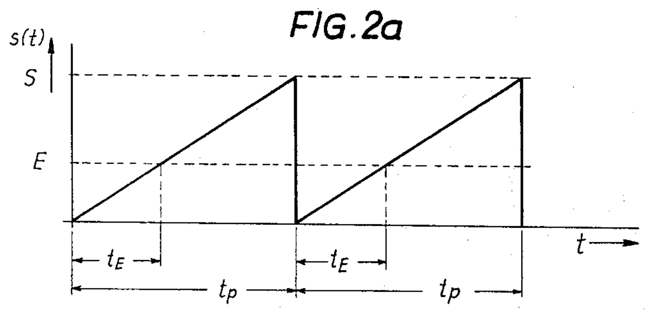
Figure 2B:
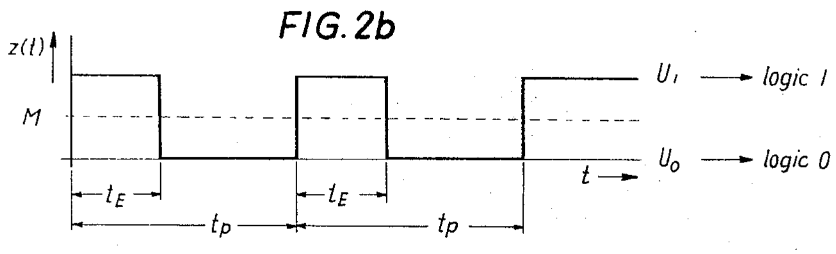

The circuit arrangement according to the invention in FIG. 1*a* comprises a detector 1 transmitting a magnitude such as a force, acceleration, potential, current or other mechanical, optical, acousti or electrical magnitude. The physical magnitude $m(t)$ occurring in the general case will be transduced by transducer 2 into an electrical magnitude $e(t)$ and fed in this form to a threshold controlled comparison and decision unit 3. Unit 3 compares the value $e(t)$ with the threshold value $v(t)$ generated by a threshold generator 4, and decides for what value of $t$ the inequality (1), $$e(t) \geq v(t) \tag{1}$$

will be satisfied. The corresponding evolution of the comparison and decision process will be explained now under the simplifying assumptions of $e(t) = E$, a constant voltage, and $v(t) = s(t)$, a saw-tooth potential (FIG. 2*a*), as shown in FIGS. 2*a* and 2*b*. In that case E may readily be visualized as a computational value in electrical form. FIG. 2*a* shows the evolution of the saw-tooth potential $s(t)$, its maximum value S and the time-constant value $E$. Corresponding to the assumptions shown in FIGS. 2*a* and 2*b*. The potential level $U_1$ will appear at the output of the function unit 3 as long as (FIG. 2*b*) the inequality (2), $$E \geq s(t) \tag{2}$$

will hold; otherwise the potential level will be $U_o$. If according to FIG. 2*b* the potential level $U_1$ indicates the state of "logic 1" and the level $U_o$ the state of "logic 0," a function $z(t)$ will appear at the output of unit 3, which may be mathematically described as the sequence of the states "logic 0 and 1."

Below, the states logic 0 and 1 will be described as states 0 and 1 for the sake of brevity. The sequence $z(t)$ is concretely related to the inequality (2) according to FIG. 2*b*, being due to a periodic sequence of the states 0 and 1. The relative frequency of state 1 in $z(t)$ is directly proportional to the value $E$. For sufficient long observation, a relative frequency if properly measured is equal to its probability from probability theory. It is easy to see from FIG. 2*a* that the frequency of state 1 is proportional to the time $t_E$ and therefore the probability of state 1 in $z(t)$, $p(Z:=1)$, may be computed from Eq. (3)

$$p(Z:=1)=t_E/t_p=E/S \tag{3}$$

which indicates the direct proportionality between probability of state 1 and value $E$.

In the sense of communication theory, the function $z(t)$ is a binary electrical signal with all the advantages of binary signals.

Figure 1B:
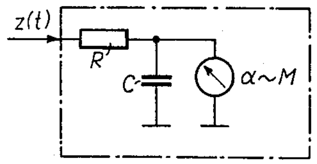
Figures 3A, 3B, 3C, 3D:
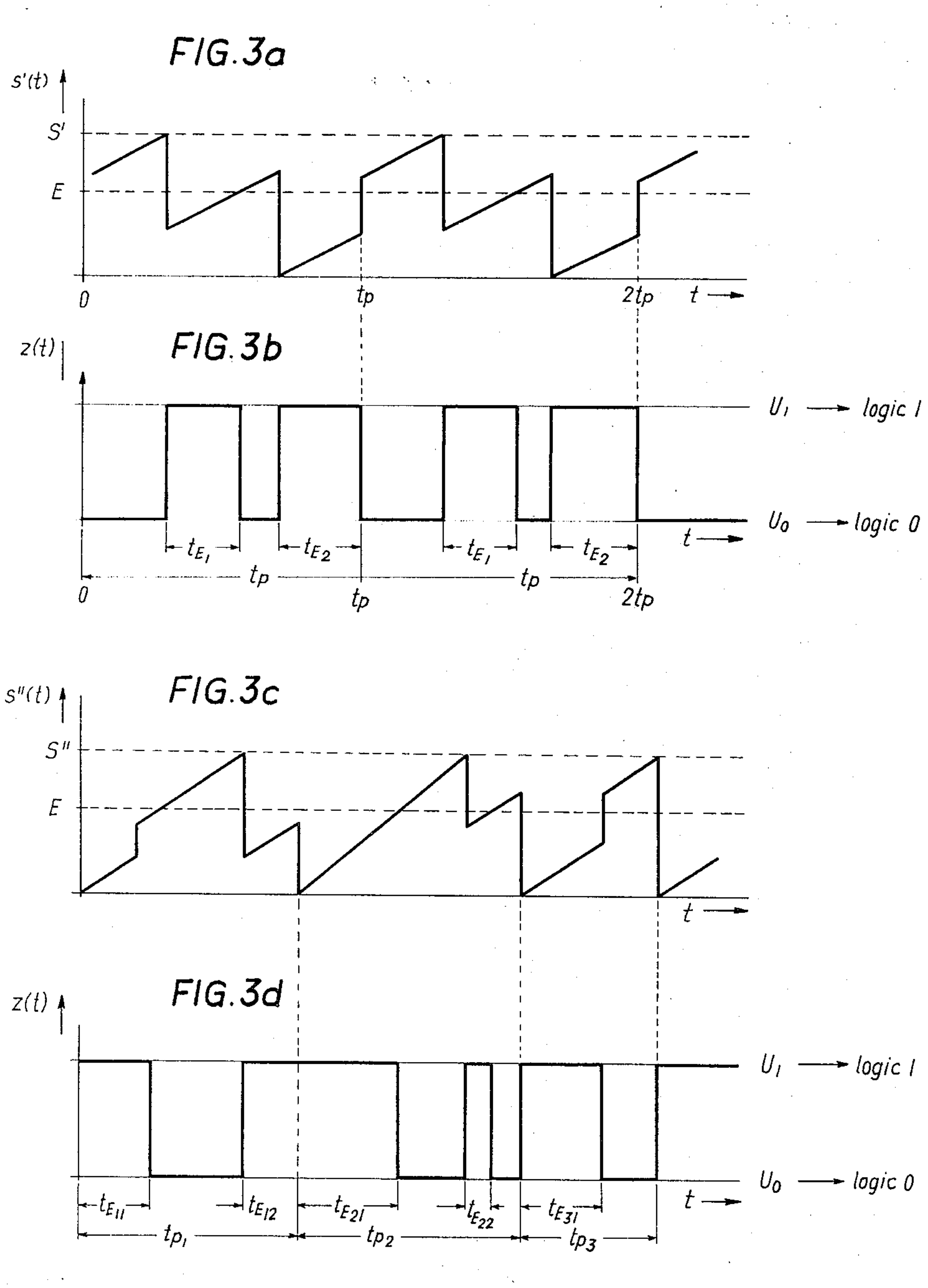

A binary signal $z(t)$ appears at the output of unit 3, which satisfies the relationships of Eq. (4), $$Mt_p=St_E \tag{4}$$

where $M$ is the mean-time value of the sequence $z(t)$. Then, because of Eq. (3), Eq. (5) will hold, namely $$M/S=t_E/t_p=E/S \tag{5}$$

so that M and E are identical, In summary, the circuit of FIG. 1 associates a binary sequence $z(t)$ with a constant computational magnitude E, where the mean time value of $z(t)$ is proportional to to the probability $p(Z:=1)$ and therefore to the magnitude $E$. This part of the circuit according to the invention functions as a coder providing a binary signal $z(t)$ from which the computational value may be particularly easily recovered in analogue fashion. In the simplest case the analogue output may take place according to FIG. 1*b* through an DC network and a galvanometer the deflection of which (alpha) is proportional to the magnitude M and therefore to $E$. This kind of coding further provides the advantage that higher immunity to interference obtains for the binary signal as compared to common codings. This immunity to interferences is related with the previously mentioned transducing of the analog value into a state probability of the binary signal $z(t)$. For this kind of analog transducing, the interferences are the less effective, the more pulse events are involved in $z(t)$ during the recovery of the analog value. FIG. 2*b* shows that $z(t)$ in this special case is a periodical signal. In this respect, the determination of the value of M according to Eq. (5) amounts to measuring the time $t_E$. Such a time measurement nowadays can be performed with high accuracy by means of electronic counters. One sees from the simple assumptions in mathematics that the linear realtionship between the probability $p(Z=1)$ and the value $E$ occurs on account of the linear saw tooth. Mathematically, this is equivalent to the constant amplitude frequency distribution of a saw tooth potential. Besides the latter, there is an arbitrary number of other periodic functions which show a constant amplitude frequency distribution and which are equally subject to the above considerations. Such an instance is provided by the potential $s'(t)$ in FIG. 3*a*, and the corresponding shape of the series $z(t)$ in FIG. 3*b*. The threshold potential $v(t)$ need not be periodic. One may conceive of a threshold value potential $v(t)$ composed of partial sections from various saw-tooth like potentials to obtain a resultant $s''(t)$ that would always satisfy Eq. (3). FIG. 3*c* and 3*d* illustrate such a conception.

In the case of signal processing of FIGS. 3*a* and 3*b* the validity of Eq. (3) corresponds to the form (6)

$$p(Z:=1)=(t_{E1}+t_{E2})/t_p=E/S \tag{6}$$

and, in relation to FIGS. 3*c* and 3*d*, to the form (7)

$$p(Z:=1)=\sum_j t_{Eij}/t_{pi}=E/S \tag{7}$$

Finally, a stochastic generator may also be used for generating the threshold value potential, the stochastic output signal $v(t)$ of which has a constant amplitude frequency density.

FIG. 1*a* shows the fundamental analog-digital conversion which may be called "ergodic." Several remarks concerning the concept of ergodicity are presented so that the concept of an "ergodic converter" may be comprehensible.

If within the scope of the objective plausibility requirements precise mathematical definitions are waived, the following may be said about the concept of ergodicity: in the mathematical sense, probabilities are "magnitudes of measurement" and do not determine unambiguous functional relationships, but only structures. Within such a structure, there is an infinite number of functional possibilities. In the sense of probability theory, the structure is called process, the associated functions are called process realisations. If one thinks of process realisations for instance as time dependent amplitude frequencies, then one may form two kinds of probabilities. On one hand one may observe at a given time the instantaneous amplitude values of the individual realisations and from these one may form the relative amplitude frequencies and in the limiting case of observing an infinite number of realisations, one may thus obtain the probabilities. On the other hand one may observe the sequence of amplitudes of an arbitrarily selected realisation over the course of time and derive therefrom the relative amplitude frequencies and for the limiting case of unending observation, one may thus obtain the probabilities. When dealing with ergodic processes, the two probability measurements thus obtained are the same and independent of the realisation selected. The mathematically exact form of this theorem is called the ergodic theorem. The arrangement in FIG. 1*a* for the special case converts a magnitude $E$ as a function of a time-dependent, so-called comparison magnitude $v(t)$, into a binary sequence $z(t)$, which has the property that the relative frequency of state 1 in $z(t)$ is directly proportional to the magnitude $E$. For each curve $v(t)$, which may be interpreted as the realization of the same process, namely, it shows the same structure, the arrangement of FIG. 1*a* while providing different series $z(t)$, nevertheless does provide these with the same probability $p(Z:=1)=E/S$, according to Eq. (3). On this ground alone the conversion takes place according to the mentioned ergodic theorem. In order to stress this fact, the conversion was termed ergodic conversion.

With respect to the elucidation for FIG. 1*a*, an ergodic analog-digital conversion has been described, which is meant particularly for an analog output.

Another form of the binary signal $z(t)$ is more suited for the digital output of the computed value $E$. Since according to Eq. (3) the value of $E$ is proportional to the occurrence of state "logic 1" in $z(t)$, namely $p(Z:=1)$, the digital output of the computed value $E$ amounts to digital measurement of the probability $p(Z:=1)$. To arrange so with priority, unit 3 of FIG. 1a may be modified to 3″ according to FIG. 4a, namely with a trigger generator or synchronizer 7 with an ergodic converter 8 and with a scanning network 6. Then the series $z(t)$ will be scanned at pulse $T$ delivered by the synchronizing generator 7. The scanned values $z(t_k)$, with $k=0.1 \ldots$, form a binary pulse series the relative pulse frequency of which is proportional to the value $E$. FIG. 4b shows a variation for the generation of the binary pulse sequence $z(t_k)$.

The signal processing shown in FIG. 4b will be explained by means of FIGS. 5a, 5b and 5e, together with a stochastic threshold value potential $v(t)$ delivered by generator 4′.

FIG. 4b shows the receiver 1, which passes on the measured value $m(t)$ which will be converted in transducer 2 into an electrical magnitude $e(t)$. The following threshold-value controlled comparison and decision unit 3″ comprises the ergodic converter 8, which, as explained in greater detail in FIG. 4c, is fed by the magnitude $e(t)$, and in special cases from the computed value $E$, by the threshold value potential $v(t)$ supplied from stochastic generator 4′, and by synchronizing generator 7. This causes the occurrence of the comparison and decision process in 3″ at discrete trigger times $t_k$ that are determined by synchronizing generator 7. In order to simplify the the electronic comparison and decision process, the potential $v(t)$ is biased with a sufficient DC potential V, so that decisions are required for only one polarity. This above mentioned comparison potential for the sake of simplicity will also be designated by $v(t)$ below and is illustrated in FIG. 5a. Unit 3″ compares the magnitude $E$ only at pulse times $t_k$ with respect to the potential $v(t)$. This means, with respect to signal processing, that the magnitude $E$ will only be compared with the threshold potential at the synchronizing times, that is with $v(t_k)$, as shown in FIG. 5b. Thus at the sychronizing times, unit 3″ will make decisions in the form of pulses or gaps between pulses. A pulse will always appear at the output of unit 3″ when the threshold value potential $v(t)$ at time $t_k$ is less than the magnitude E, otherwise there will be a pulse gap or interval. The pulses and pulse intervals at the output of unit 3″ form a binary random sequence $z(t_k)$, which is shown in FIG. 5c. If the pulse event is associated with state "logic 1" and the event of pulse gap with the state "logic 0," the relative pulse frequency in $z(t_k)$ will also indicate the relative frequency of occurrence of state "logic 1" in $z(t_k)$. Again in the sense of probability theory, this means that for sufficiently long a time of observation, a relative frequency of occurrence for instance of state 1 in $z(t_k)$ is to be set equal to the corresponding probability $p(Z:=1; t=t_k)$ for sufficiently accurate measurements. It will be shown next that for signal processing as in FIGS. 5a through 5c, there is a linear relationship between the probability $p(Z=1; t=t_k)$ and the value $E$. This is best shown by the case of two boundary problems.

If the value of $E$ is so large that the threshold potential $v(t)$ is exceeded at all times, then unit 3″ will emit only pulses at the synchronizing times and the series $z(t_k)$ will solely consist of logic 1-decisions. In other words, the state 1 will occur at the synchronizing times with probability $p(Z:=1; t=t_k)=1$ in the series $z(t_k)$. If on the other hand the value of $E$ is so low that that the series $z(t_k)$ will consist only of logic 0-decisions because at every synchronizing time, $v(t)$ is much larger than $E$, then the probability $p(Z:=1; t=t_k)$ is zero. If the value of $E$ is between those two limits, then there will be a definite number of logic 0-and 1-decisions in the series $z(t_k)$ depending on the magnitude of $E$. The number of logic 1-decisions and hence its relative frequency of occurrence increases and decreases with the value of $E$, thus being functionally dependent. For the case of a stochastic threshold value potential $v(t)$ of constant amplitude frequency, this dependence is linear, as will be shown by the following mathematical considerations. The pulse probability for $z(t_k)$ $p(Z:=1;=t_k)$ besides depending on the value of $E$ also depends on the amplitude frequency of occurrence of the threshold value potential $v(t)$, namely on $p(v)$, and may be expressed generally as $$p(Z:=1; t=t_k)=\int_0^E p(v)dv \quad (8)$$

For the objective assumption of a constant frequency of amplitudes, one obtains $$p(v)=1/H=\text{const.}$$

This leads from Eq. (8) to Eq. (8a), $$p(Z:=1; t=t_k)=E/H \quad (8a)$$

which provides the value of $E/H$ and allows insight into the linear relationship between probability of state 1 in the series $z(t_k)$ at the synchronizing times and the value of $E$.

The binary sequence $z(t_k)$ is a pulse series as explained above, in which a pulse probability $p(Z:=1; t=t_k)$ is proportional to the computational value $E$. This form of converting a computational magnitude into a synchronized binary series $z(t_k)$ is particularly suited for a digital output of the computational value $E$ from the series $z(t_k)$ by measuring the probability $p(Z:=1; t=t_k)$ digitally. FIG. 6 shows the principle of such a measurement and demonstrates its simplicity: the series $z(t_k)$ is fed into the measuring input $f_x$ and a digital counter 9. The counter indication $\delta$ is a direct measure of the probability $p(Z:=1; t=t_k)$ and hence of the value of $E$. FIG. 4d shows a further variation 3‴ for the threshold-value controlled comparison and decision unit 3; FIG. 4e shows a variation 4″ of the threshold value generator 4.

Eq. (8) shows the influence of the amplitude frequency of occurence of the threshold-value potential $v(t)$, $p(v)$ with respect to the functional relationship of the $E$ value with the probability $p(Z:=1; t=t_k)$. If the integral in (8) is solved, there will be $$\int_0^E p(v)dv=P(E)-P(O) \quad (9)$$

which is the difference between the values of the so-called probability distribution function of the potential $v(t)$, $p(v)$ at the integration limits. By definition, $P(0)=0$, so that Eqs. (8) and (9) lead to $$p(Z:=1; t-t_k)=P(E) \quad (10)$$

The probability distribution function $P(v)$ thus behaves as as a transform for the computational values $E$.

In the sense of probability theory, the periodic functions too have probability distributions. These always correspond to the inverse functions of the periodic functions. Thus even complex transforms may be obtained, if their inverse functions are simple ones. This is the case for instance for the logarithm or for obtaining roots, the inverse functions of which are resp. the exponential and the parabolic functions. If the previous assumption of a constant computational value E is not met, and if it is $e(t)$ instead as shown in FIG. 1*a*, namely a variable process, then we must consider two different cases for the ergodic conversion according to the invention. In the first case the fluctuations in $e(t)$ are small compared to the time-values $t_{Eij}$ and $t_{\mu i}$ from Eq. (7) and FIG. 3*d*, so that the value of $e(t)$ may be considered practically constant during the measuring time $t_w$ for the probability $p(Z:=1)$ of $p(Z:=1;\, t=t_k)$. In case of signal processing in the sense of the invention and FIGS. 3 and 5, this means that for periodic threshold value potentials $v(t)$ enough periods — and for stochastic threshold value potentials $v(t)$ enough time, and in the synchronized case according to FIGS. 4*a* through 4*d* therefore enough synchronizing steps — must have elapsed during the time $\Delta t_w$ in which the magnitude $e(t)$ has been considered quasi-constant for determining the probabilities $p(Z:=1)$ or $p(Z:=1;\, t=t_k)$ with the required accuracy from the series $z(t)$ or $z(t_k)$. These probabilities fluctuate synchronously with $e(t)$. The probabilities $p(Z:=1)$ or $p(Z:=1 1\, t=t_k)$ therefore are proportional to the instantaneous value of $e(t)$, the latter's fluctuations being so slow, as already mentioned, that it is quasi-constant during the time of measurement $\Delta t_w$, and therefore one may consider that $$e(t) = e(t + \Delta t_w) \tag{11}$$

holds within instrument accuracy.

Said restrictions also may be neglected for rapidly varying computational values $e(t)$ if these are computed solely from definite mean values such as arithmetic averages, average of the absolute amounts, square average or other signal characteristics in the sense of the invention.

It has been shown that for the assumptions made so far, that is constant or quasi-constant computational value $E$ or $e(t)$, an analog value may be associated with binary random series for which the occurrence probabilities of state One are proportional to a constant computational value or to the instantaneous value of a varying computational value. For magnitudes $e(t)$ rapidly changing with time, the arrangements shown in FIGS. 1*a*, 1*b*, 4*a* and 4*b* may also be used, if characteristic values of $e(t)$ are to be computed. A random binary sequnce will be obtained in each case, where the probability of occurrence of the logic state 1 is proportional to the given signal characteristic. This will be illustrated by means of five representative examples. For the sake of simplifying the decision processes as already previously mentioned, it will be assumed that the computational values are equally biased in such manner that only decisions with respect to one polarity are required. The first example will be a computational circuit for the case of the linear or arithmetic mean value of a computational magnitude $e(t)$ when using timed pulse series and an evenly distributed stochastic threshold value potential $v(t)$.

If the circuit of FIG. 4*b* is used, then Eq. (8) may be modified to $$p(Z:=1;\, t=t_k) = \int_0^{e(t_k)} p(v)dv = e(t_k)/H = E_k/H \tag{12}$$

The relation (12) shows that the probability of a pulse event in the series $z(t_k)$ at time $t_k$ is proportional to the instantaneous value $E_K$ of the computational value $e(t)$ at that time. Measurement of a probability can only be effected by observing the relative frequency over a sufficient long time, in the present case therefore by observing the pulse frequency of occurrence in the series $z(t_k)$ over many timing points. Then one obtains a value $P_{1N}$ which is averaged over $k$ for the probability $p(Z:=1;\, t=t_k)$ $$p_{1N} = \frac{1}{2N+1}\sum_{k=-N}^{N} p(Z:=1;\, t=t_k) = \frac{1}{H(2N+1)}\sum_{k=-N}^{N} e(t_k) \tag{13}$$

where, for sufficiently large $N$ and adequate measuring accuracy, this value becomes the mean probability of a pulse at $z(t_k)$, $p_1$. The limiting value for $p_1$ therefore is given by $$p_1 = \lim_{N\to\infty} p_{1N} = (1/H) \lim_{N\to\infty} (1/2T) \int_{-T}^{T} e(t)dt = \frac{\overline{e(t)}}{H} \tag{14}$$

Except for a multiplying factor, this value is the mean time value $e(t)$ of the computational value $e(t)$, that is, its linear average. This relationship holds as well for deterministic as for stochastic signals $e(t)$. To round out plausibility in this respect, let it be observed that each amplitude of a stationary stocastic signal will recur with a frequency corresponding to its probability over a sufficiently long interval of observation. The averaging in Eq. (13) extends over these relative frequencies of occurrence. In summary, one may state:

If the circuit according to the invention, for instance as in FIG. 4*b*, is controlled by a rapidly varying computational magnitude $e(t)$, one obtains a binary random series in which the relative frequency of occurrence of a pulse event is proportional to linear mean value of that computational value.

Figures 7A, 7B, 7C, 7D, 7E:
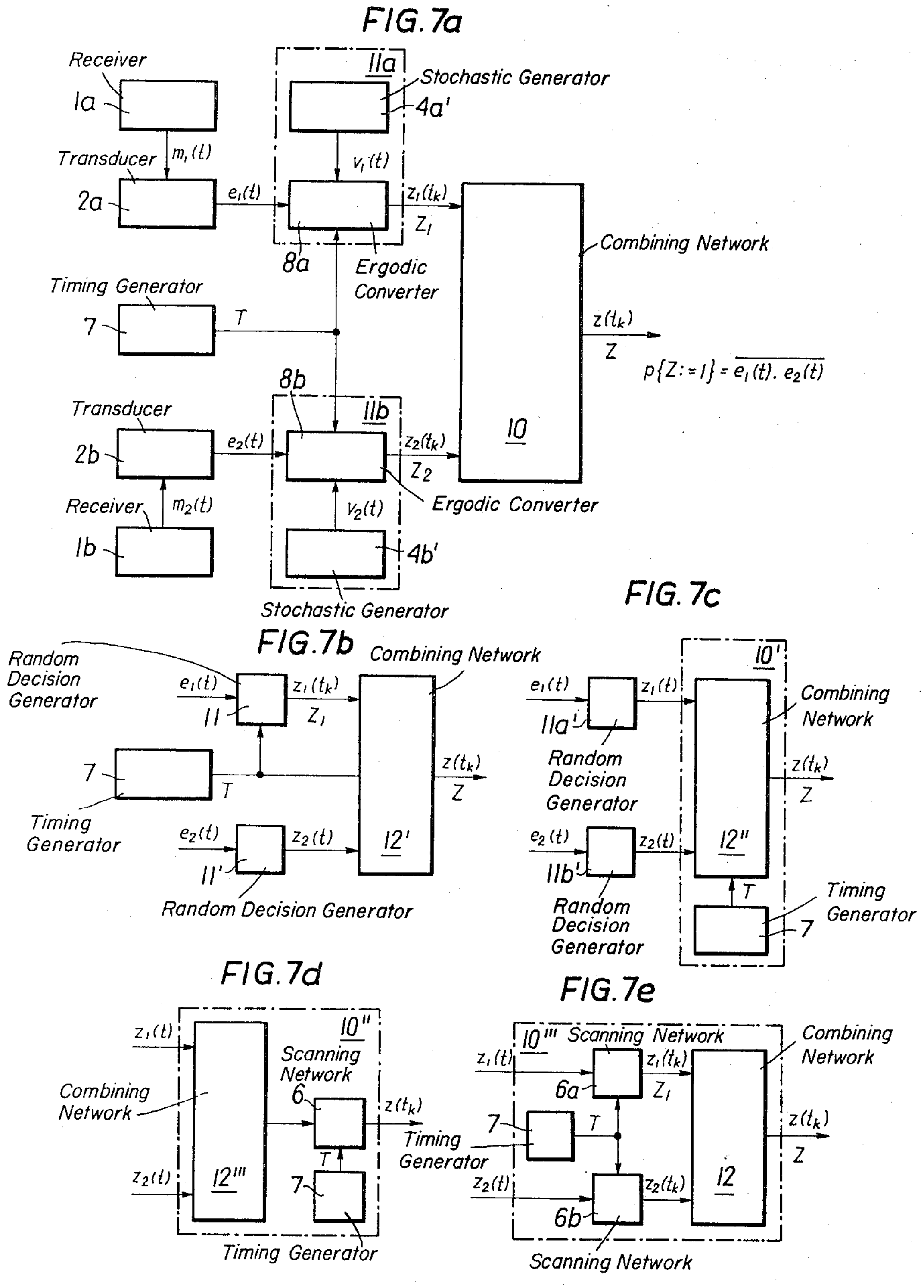

If two circuits such as in FIG. 4*b* are used and combined into a new one as in FIG. 7*a*, a computational circuit may be achieved that provides a binary sequence of random nature at its output, and where the pulse event occurs at a relative frequency which is proportional to the mean value of the product of two signals $e_1(t)$ and $e_2(t)$. The operation of this circuit will be described shortly. As was done similarly in FIG. 4*b*, units 1*a* and 2*a* in FIG. 7*a* form a signal $e_1(t)$ that is fed to the ergodic converter 8*a*, which is also fed from stochastic generator 4'*a* and timing generator 7. The functional components 4'*a* and 8*a* are consolidated into one unit 11*a*, which will be called the Random Decision Generator (RDG). RDG 11*a* is triggered by trigger T and controlled by means of signal $e_1(t)$. Similarly units 1*b* and 2*b* form a signal $e_2(t)$ which controls RDG 11*b*. At the outputs of RDG 11*a* or 11*b* there arise binary random series $z_1(t_k)$ or $z_2(t_k)$. These two random binary series for the sake of brevity will be denoted as $Z_1$ and $Z_2$.

The threshold value potentials $v_1(t)$ and $v_2(t)$ being assumed statistically independent, the random series $Z_1$ and $Z_2$ too are statistically independent. If the series $Z_1$ and $Z_2$ are connected by means of a junction network 10 so as to obtain conjunctively a new series Z, then according to the multiplication theorem of probability theory, the probability of a pulse in Z is equal to the product of the probabilities for a pulse in $Z_1$ and for $Z_2$. Brief consideration will show that antivalent* connection of the binary series $Z_1$ and $Z_2$ is preferable to conjunctive connection, since those constants will drop out that are determined by signal biasing. The formation of the resultant series Z will therefore shortly be discussed for the case of antivalent connection.

* perhaps means "opposing;" transl.

If $p_{1k}(0)$ or $p_{1k}(1)$ denote the probability of zero or one decision at the time $t_k$ in series $Z_1$, then similar notation for the corresponding probabilities in $Z_2$ and Z for antivalent connection of series $Z_1$ and $Z_2$ lead to the system of equations, $$p_k(0) = p_{1k}(1)p_{2k}(1) + p_{1k}(0)p_{2k}(0)$$
$$p_k(1) = p_{1k}(1)p_{2k}(0) + p_{1k}(0)p_{2k}(1) \tag{15}$$

For further computation, it must be considered that because of simplification in decision, the threshold value potential $v(t)$ contained the bias $V$, and therefore $v_1(t)$ or $v_2(t)$ comprises biases $V_1$ or $V_2$. In order to achieve the corresponding modulation ranges in $v_1(t)$ or $v_2(t)$ with signals $e_1(t)$, it will be assumed for the sake of simplicity that the biases $e_1(t)$ and $e_2(t)$ are identical with $v_1$ and $v_2$ respectively. From the probability theory relation $$\int_0^{V_{max}} p(v)dv = 1 \tag{16}$$

one obtains, — assuming $p(v_i) = 1/H_i$ —, $$V_{imax} = H_i = 2V_i \tag{17}$$

where $i = 1,2$; since the nominal point of an electrical circuit is best set in the middle of its modulation range.

the instantaneous values $E_{ik} = H_i/2 + e_i(t_k)$ are obtained from Eqs. (12) and (17), where $i = 1,2$; from the probabilities of Eq. (15) one obtains $$p_{1k}(1) = 1 - p_{1k}(0) = E_{1k}/H_1 \, ½ + e_1(t_k)/H_1$$
$$p_{2k}(1) = 1 - p_{2k}(0) = E_{2k}/H_2 = ½ + e_2(t_k)/H_2$$
$$p_k(1) = 1 - p_k(0) = ½ - [e_1(t_k)/H_1]\cdot[e_2(t_k)/H_2] \tag{18}$$

The mean relative frequency of occurrence of a pulse in series Z in the limiting case of infinite averaging leads to the corresponding probability $p_1$ in the form $$p_1 = \lim_{N\to\infty} \frac{1}{2N+1} \sum_{k=-N}^{N} p_k(1)$$
$$= \frac{1}{2} - \frac{1}{H_1H_2} \lim_{T\to\infty} \frac{1}{2T} \int_{-T}^{T} e_1(t)e_2(t)dt \tag{19}$$

and is proportional to the mean product of the signals $e_1(t)$ and $e_2(t)$ except for a constant. If $e_1(t)$ or $e_2(t)$ are interpreted as being current-or potential- proportional magnitudes, then $p(1)$ is proportion to power.

FIGS. 7*b* through 7*e* show variations in modulation and in achieving the connecting network of FIG. 7*a*, depending on whether use is made of the RDG synchronizing pulses or not. There is always a resultant binary series at the output, with sufficient relative frequecy of occurrence of the state "logic 1" of Eq. (19) and thus representing the computational result.

The circuits of FIGS. 7*a* through 7*e* may be expanded for an arbitrary number of signals.

A further illustration of the use of the invention's circuitry will be provided by the computation of roots from time average values.

Figures 8A, 8B:
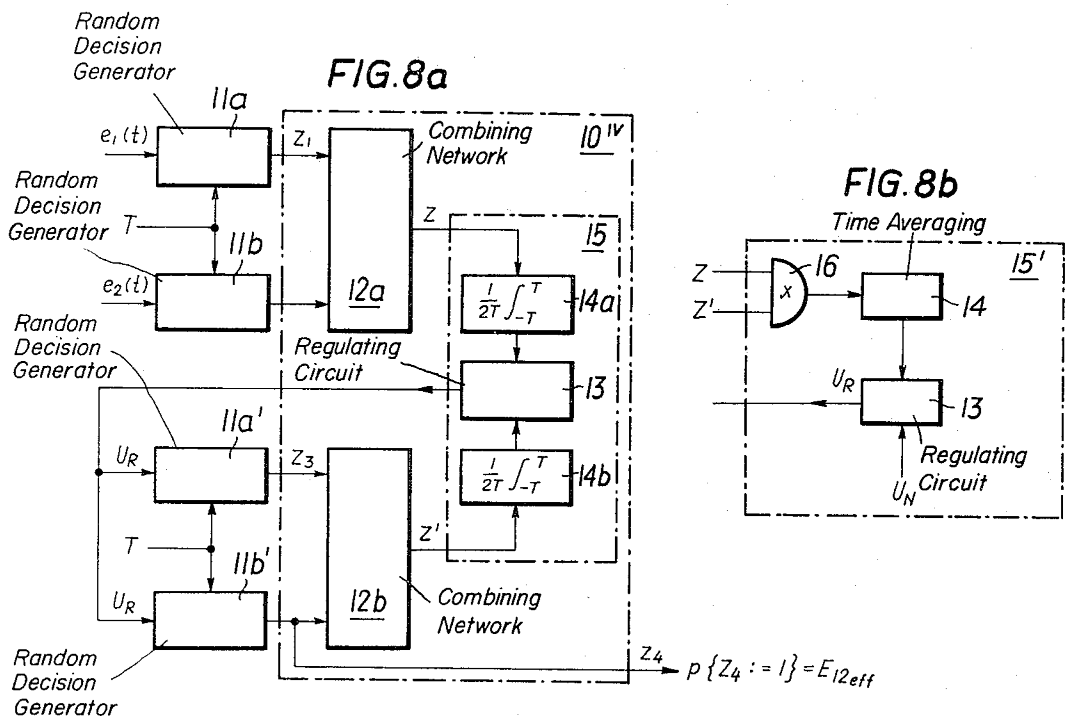

FIGS. 8*a* and 8*b* serve to illustrate the operation of the required circuit. The mean square value or the effective value of a signal $e(t)$ is the root of its mean square in the form of $$E_{eff} = \sqrt{\lim_{T\to\infty} \frac{1}{2T} \int_{-T}^{T} e^2(t)dt} \tag{20}$$

In the general case of different signals $e_1(t)$ and $e_2(t)$, one has $$E_{12eff} = \sqrt{\lim_{T\to\infty} \frac{1}{2T} \int_{-T}^{T} e_1(t)e_2(t)dt} \tag{21}$$

The computation of the value $E_{12\,eff}$ can be traced back to the generation of a binary random series with a relative pulse frequency corresponding to $p_3(1)$ satisfying $$p_3(1)p_3(1) = p(1) \tag{22}$$

FIG. 8*a* shows the logic structure for achieving this binary random sequence. RDG's 11*a* and 11*b* provide the random sequences $Z_1$ and $Z_2$ that will be connected to the resultant output sequence Z in the logic network 12*a*, the relative frequency of pulse occurrence corresponding to the probability $p(1)$. The RDG's 11'*a* and 11'*b* represent similar circuits and provide the binary random series $Z_3$ and $Z_4$. The latter are connected into the resultant series Z' in network 12*b*. The input potential $U_R$ of RDG'S 11'*a* and 11'*b* is provided by a regulating circuit 13 controlled by the mean potential values of series Z' and Z. Thus the mean potential value of the pulse series Z acts as a control magnitude, that of the Z' series as a regulating magnitude. The regulating circuit 13 generates a setting magnitude $U_R$ which is fed back to the RDG's 11'*a* and 11'*b* and applied by regulating circuit 13 as long as required to equalize the command and regulating magnitudes. The circuit shows that the probabilities for a pulse event are the same in series $Z_3$ and $Z_4$. Let this probability value be denoted by $p_3(1)$. According to the multiplication theorem of probability theory, this value $p_3(1)$ satisfies Eq. (22), where $p(1)$ is the relative pulse frequency in Z or Z'. Thus $p_3(1)$ correspond to the root of $p(1)$. The binary sequence $Z_4$ has the property that its pulse probability $p_3(1)$ yields a value proportional to the magnitude of $E_{12\,eff}$ and thus does correspond to the computational result. Finally, when the signal potentials $e_1(t)$ and $e_2(t)$ are identical, the magnitude of $p_3(1)$ is proportional to the effective value of this signal potential.

FIG. 8b shows a variation of the arrangement 15 which derives a regulating potential $U_R$ from the random series Z and Z′. It shows how Z and Z′ are connected by means of an exclusive OR gate lb into a resultant binary random sequence in which a pulse event occurs with a probability corresponding to the difference in pulse probabilities in Z and Z′. Arrangements 15 and 15′ perform similarly.

Figure 9:
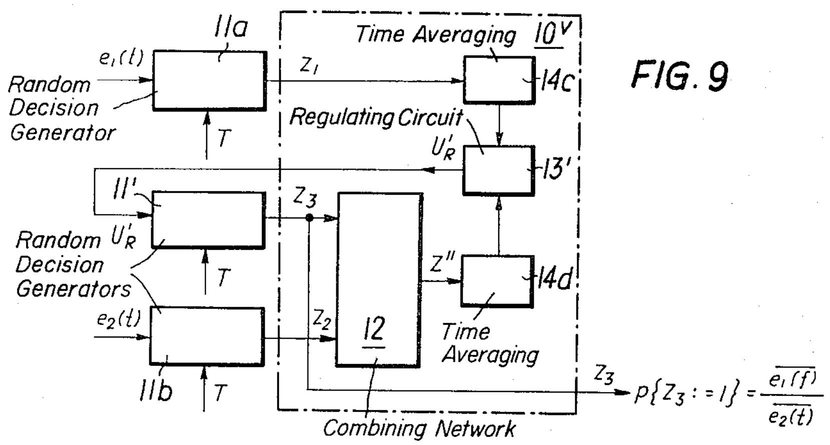

A further application of the circuits according to the invention is represented in FIG. 9 and consists of quotient-formation of time averages. For the sake of simplicity, the arrangement in FIG. 9 restricts itself to forming the quotients of linear averages of two signal functions $e_1(t)$ and $e_2(t)$. Channel 11a provides a binary random sequence $Z_1$ which, after time averaging in 14c, controls the regulating circuit 13′ as a command magnitude. RDG's 11′ and 11b provide the series $Z_3$ and $Z_2$, which will be connected antivalently into a resultant series Z″. Thus the time average value of Z″ acts as regulating magnitude for the regulating circuit 13′.

The setting magnitude $U_R'$ is fed back as an input potential to RDG 11′ and will be regulated until the pulse frequencies of occurrence in series $Z_1$ and Z″ are identical. The relative pulse frequency in series $Z_3$ then provides — according to the previously mentioned multiplication theorem of probability theory — a magnitude proportional to the quotient of the linear mean values of $e_1(t)$ and $e_2(t)$. The structure of the circuit in FIG. 9 may be correspondingly expanded for an arbitrary number of signal functions.

An important role is assumed in statistical communication theory by the correlation coefficient $\rho$ in the form of $$\rho = \phi_{12}(0) / \sqrt{\phi_{11}(0)\,\phi_{22}(0)} \tag{23}$$

where $$\phi_{ij}(o) = \lim_{T\to\infty} \frac{1}{2T}\int_{-T}^{T} e_i(t)e_j(t)dt;\ i, j = 1, 2. \tag{24}$$

Figures 10, 13:
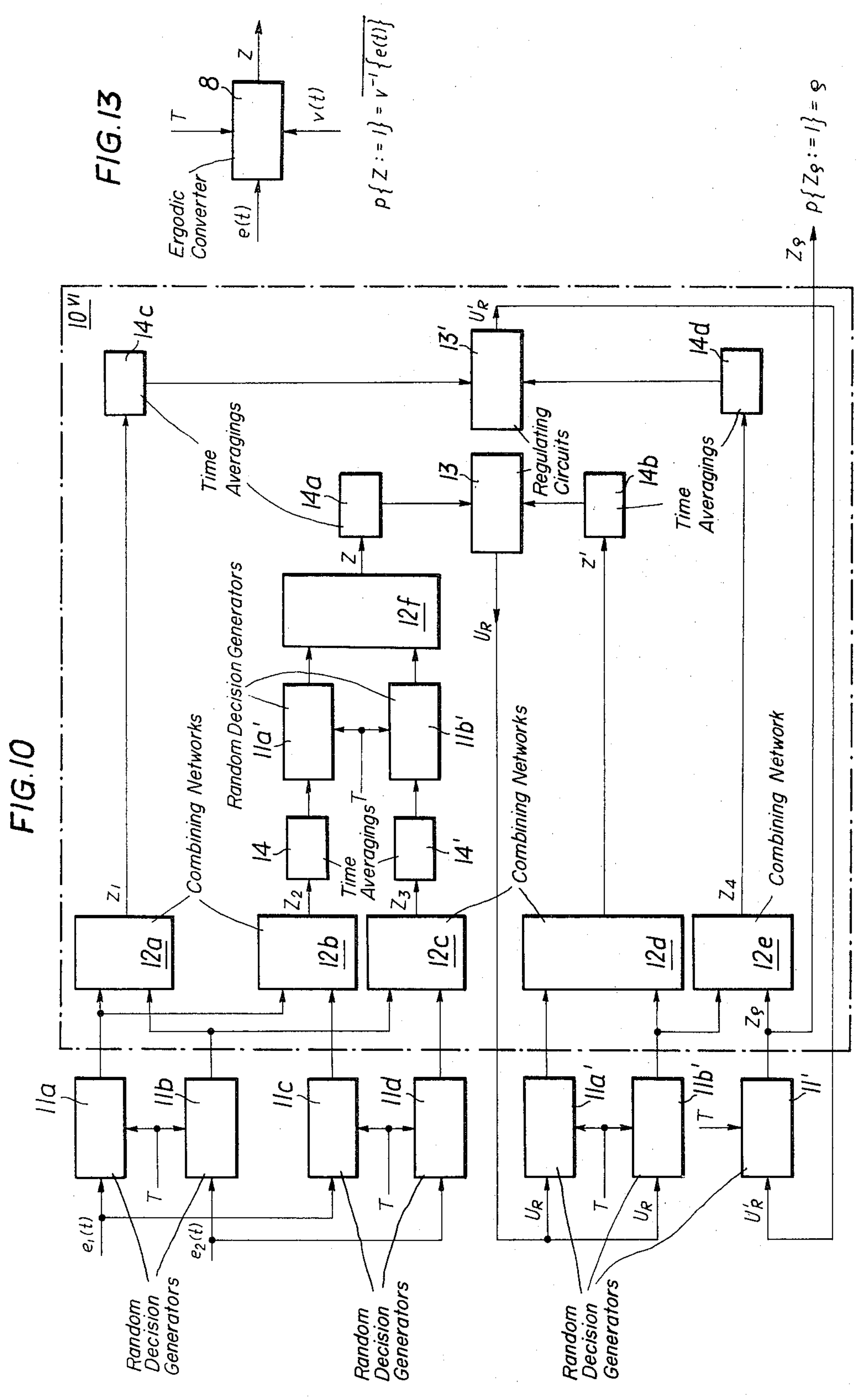

Therefore its computation by means of the invention's circuit in FIG. 10 will be briefly explained. Three binary random series $Z_1$, $Z_2$ and $Z_3$ corresponding to $\phi_{12}(0)$, $\phi_{11}(0)$ and $\phi_{22}(0)$ according to Eq. (17) and Eq. (22) are obtained from the input signals $e_1(t)$ and $e_2(t)$, similarly to the signal processing shown in FIG. 7a. The time averages of series Z and $Z_1$ act as command magnitudes for the regulating circuits 13 and 13′. The regulating magnitude for regulator 13 is provided by an arrangement 14b together with the logic network 12d, the operation of which already was described in connection with root formation. The regulating magnitude for regulator 13′ is derived from sequence $Z_4$ which is obtained from the binary random sequences or RDG's 11′ and 11′b by means of logic connection in network 12e. Thus the input signals of RDG' s 11′ and 11′b form the setting magnitudes $U_R$ and $U_R'$. The regulating circuit 13 will change its setting magnitude $U_R$ until the relative pulse frequency in random series Z′ is equal to that of random series Z. RDG 11′b then provides a random series with a pulse frequency proportional to the square root value $\sqrt{\phi_{11}(0)\,\phi_{22}(0)}$. On the other hand, the regulating circuit 13′ will change its setting magnitude $U_R'$ until the relative pulse frequency in $Z_4$ is the same as in $Z_1$, and hence proportional to the value of $\phi_{12}(0)$. Thus RDG 11′ provides a random series $Z\rho$, in which the pulses occur with a frequency proportional to $\rho$.

The next application will be an illustrative example for the computation of the average value of the absolute amount, that is, for the so-called DC value. The circuit is shown in FIGS. 11a and 11b and the associated signal processing in FIG. 12.

Figures 11A, 11B:
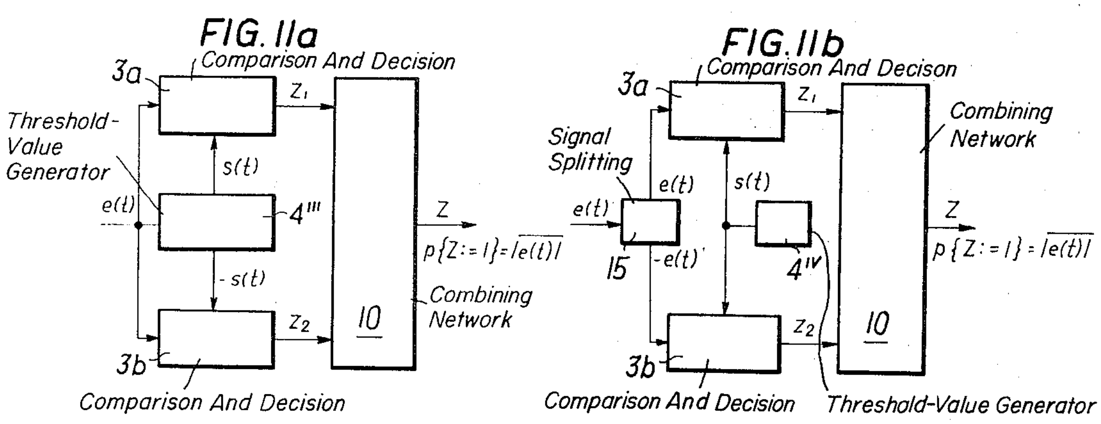
Figures 12A, 12B, 12C, 12D:
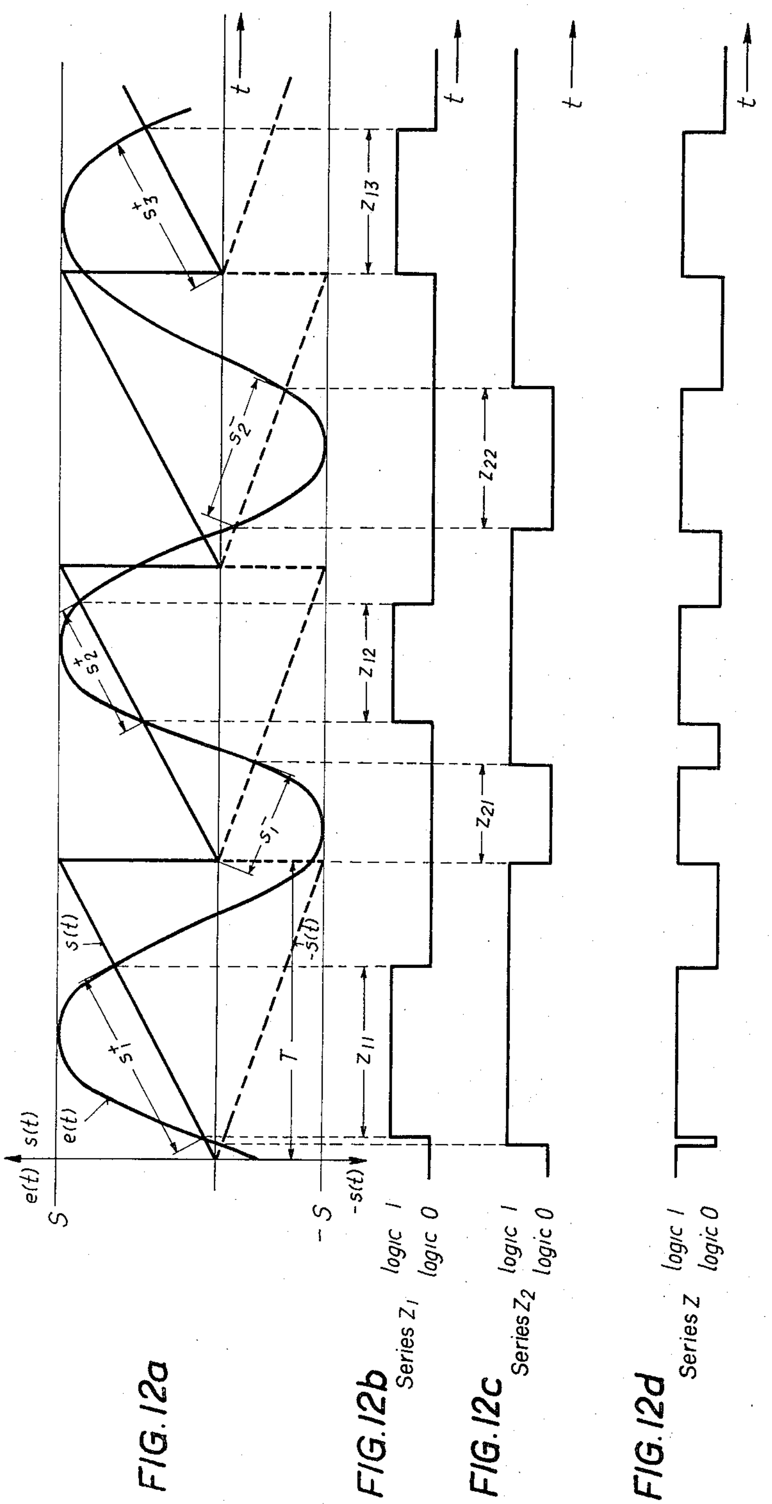

The signal $e(t)$ in FIG. 11a is fed to units 3a and 3b, which compare it to their comparison potentials in the form of saw tooth potentials $s(t)$ and $-s(t)$ resp. The saw tooth potentials $s(t)$ or $-s(t)$ are provided by the threshold value generator 4‴. FIGS. 12a through 12c show the decision diagram of units 3a and 3b and the output pulse series $Z_1$ and $Z_2$ for the case of a saw-tooth threshold value potential.

Figure 16A:
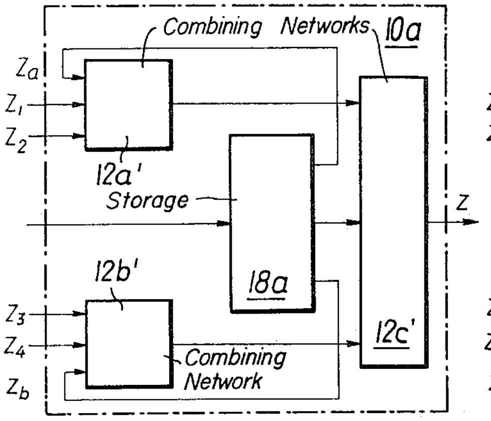

As shown by FIG. 12b, unit 3a provides a potential as long as $e(t)$ is larger than the saw tooth potential $s(t)$, where the former corresponds to the logic state 1; otherwise the output potential of unit 3a corresponds to the logic state 0.

a. programming storage which, as known from the data processing technology, are externally controlled and influence the course of data processing. FIG. 16a illustrates one such storage in operational form.

Similar considerations apply to unit 3b as shown in FIG. 12c. The sequence of the potential changes in the outputs of units 3a and 3b each form a binary pulse series, the logic equivalents of which are denoted by $Z_1$ and $Z_2$ respectively. Mathematically these conditions may be expressed by the system of inequalities (25) for unit 3a;

$$\begin{aligned} e(t) &\geq s(t) \rightarrow Z_1 := 1 \\ e(t) &< s(t) \rightarrow Z_1 := 0 \text{ where } s(t) \leq 0 \end{aligned} \tag{25}$$

and for unit 3b, by the system of inequalities (26), $$\begin{aligned} e(t) &\geq -s(t) \rightarrow Z_2 := 1 \\ e(t) &< -s(t) \rightarrow Z_2 := 0 \text{ where } -s(t) \leq 0 \end{aligned} \tag{26}$$

When simultaneously considering the inequalities (25) and (26), it will be observed that $Z_1 := 1$; $Z_2 := 1$; and $Z_2 := 0$; and $Z_1 := 0$ implicitly. the two series $Z_1$ and $Z_2$ are combined in a logic network 10, for instance in an equivalence circuit, into a logic 0–1 series Z. The following truth table applies to this kind of logic combination:

| $Z_1$ | $Z_2$ | Z |
|---|---|---|
| 0 | 0 | 1 |
| 0 | 1 | 0 |
| 1 | 0 | 0 |
| 1 | 1 | 1 |

As concerns the periodic signal $e(t)$ shown in connection with a sawtooth potential $s(t)$ or $-s(t)$ in FIG. 12a, the described logic decision or combination course when illustrated means that the pulse lengths $z_{1i}$ or $z_{2i}$ ($i = 1,2 \ldots$) of series $Z_1$ and $Z_2$ respectively are proportional,—in the chord lengths cut out by the saw-tooth potentials $s(t)$ or $-s(t)$ in the signal $e(t)$, — to the slope $\pm S/T\ s_i^+$ and $s_i^-$ respectively. If the signal $e(t)$ and the saw-tooth potential $s(t)$ are incommensurate with respect to their spectrum frequencies, the sequence $Z_1$ will be composed of pulses, the lengths of which $(z_{1i})$ on the average will correspond to all possible chords $s_i^+$ of the positive signal parts, while the pulse lengths $z_{2i}$ from $z_2$ similarly will correspond to all possible chords $s_i^-$ of the negative signal parts. The relative frequency of occurrence of the state "logic 1" in $Z_1$ therefore provides a value proportional to the mean arithmetic value of the positive signal parts, and the corresponding frequency of occurrence in $Z_2$ the corresponding magnitude of the negative signal parts — though with a positive sign. FIG. 12*d* shows that after the equivalent combination of $Z_1$ and $Z_2$ into Z, the relative frequency of occurrence of the state "logic 1" in Z is proportional to the arithmetic mean value of the signal absolute value. FIG. 12*b* shows another way of obtaining the DC value.

A further applicaton of the invention's circuitry consists in a computational circuit for achieving signal transforms. From probability theory considerations, it can be shown that an ergodic converter 8, controlled as shown in FIG. 13, will provide a random binary sequence $Z_1$ the relative pulse frequency of which corresponds the time average of the signal $e(t)$ transformed by means of the amplitude distribution function $P(v)$ of the threshold value potential $v(t)$. With respect to the mathematical background of this consideration, one should consult the relevant mathematical literature. These relationships also hold for a periodic potential $v(t)$, where the latter's amplitude spectrum $P(v)$ may be stated in the form of its inverse function $(v)^{-1}$. The representation of FIG. 13 makes it obvious that this circuit arrangement may be extended to several input signals and several transforms.

Besides the fundamental operations that were described, multiplications, divisions, taking of roots and placing exponentials, addition and subtraction are missing. FIG. 1*a* shows a circuit achieving the stochastic-ergodic conversion of a computational magnitude into the relative pulse or pulse-length frequency of occurrence of a two-valued series. Eq. (7) indicates the linear proportionality between the computational value and the associated relative pulse or pulse-length frequency. From the pertinent considerations, it is obvious how to provide a circuit for the addition of two computational magnitudes according to FIG. 14*a*. This circuit shows the conversion of physical magnitudes $m_1(t)$ and $m_2(t)$ into electrical ones, $e_1(t)$ and $e_2(t)$ in transducers 18*a* and 18*b*, and the analog summation of the electrical computational magnitudes $e_1(t)$ and $e_2(t)$ in adder 16. Converter 2*a* therefore emits a magnitude $e_s(t)$ which corresponds to the sum of the two magnitudes $e_1(t)$ and $e_2(t)$. Ergodic conversion of the magnitude $e_s(t)$ occurs in the scanned RDG 11′. Series Z at the output of RDG 11′ has the property of a relative pulse frequency corresponding to the time average of the sum of the magnitudes $e_1(t)$ and $e_2(t)$. The same applies to the probability $1(Z{:}=1)$. The binary series Z may be processed further in connection with complex computational operations. This also applies to the subtraction of two magnitudes $e_1(t)$ and $e_2(t)$ according to FIG. 14*b*. That magnitude to be subtracted will be fed via a converter 17 in transducer 2*b*, where practically as in FIG. 14*b* the converter forms the inverted magnitude $-e_2(t)$ from $e_2(t)$. The remainder of the signal processing corresponds to that in FIG. 14*a* and need not be repeated here. Some discussion however is required as regards the modulation problems for both operations. If for the sake of simplicity one assumes that both magnitudes are free from DC in the amplitude range of $\pm$ A, then after passing through the adder 16, there will be a magnitude of maximum amplitude $\pm$ 2A. The previously mentioned biases of magnitudes or signals must therefore be chosen correspondingly for the purpose of unipolar decision processes in the ensuing RDG and in latter's modulation range.

Figure 14A:
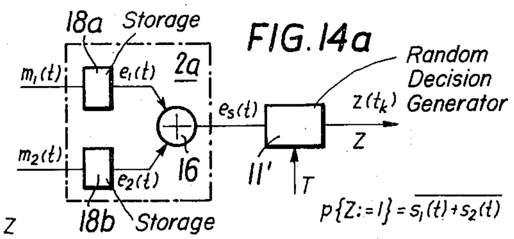
Figure 14B:
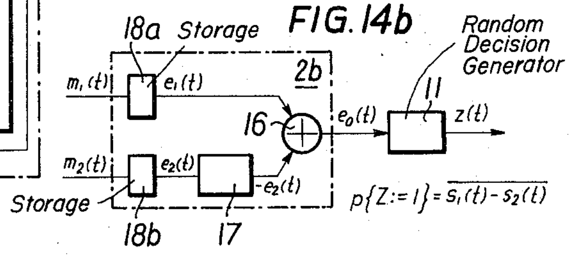

From the discussion above, extension of addition or subtraction circuits of FIG. 14*a* and 14*b* to more than two signals or computational magnitudes is obvious.

Doubling the required modulation range for addition or subtraction of two signals when several signals are present corresponds to a multiplication of the modulation range equal to the number of signals. It is immediately seen that while addition and subtraction according to FIGS. 14*a* and 14*b* may be easily carried out, there are these said drawbacks which strongly restrict the use of such circuits. One may keep the initial modulation range for an arbitrary number of signals if stochastic computational circuits for addition and subtraction are used in accordance with FIG. 15.

Figure 15:
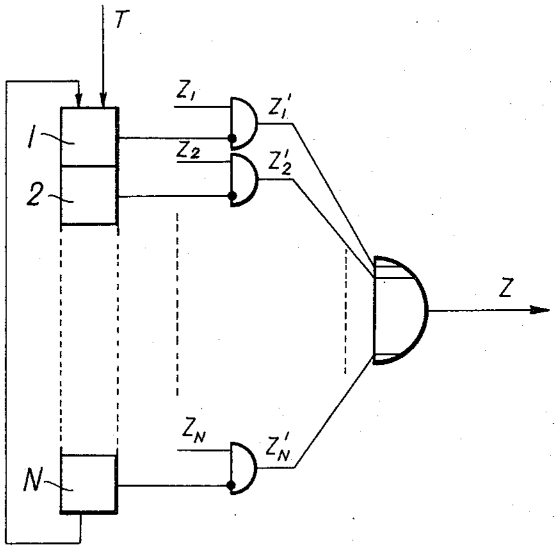

FIG. 15 shows an arrangement of N AND gates which are controlled on one hand by each trigger T in the synchronized series $Z_i$, $(i = 1, 2 \ldots N)$, and on the other hand are controlled from the *i*th location of a shift-register 19 of length N. Pulse probabilities in the series $Z_i$ are given by, $$p(Z{:}=1) = p_i,\ i = 1, 1 \ldots N \tag{27}$$

A pulse corresponding to the logic state 1 is introduced in the storage cell 1 of shift register 19 and is then continuously shifted with period T step after step in a ring counter connected to shift register 19. Thus logic state 1 at each trigger step is moved into the storage cell with the next higher number, the other storage being erased. When logic state 1 finally reaches storage place N, it is moved again to place 1 at the next trigger and the shift process begins anew. The latter only activates such AND gate as is associated with the particular storage place storing state 1 at the particular time. According to the laws of probability theory, there will therefore occur binary random series $Z_i'$ at the outputs of the individual AND gates, with pulse probabilities given by $$p(Z_i'{:}\ 1) = p_i/N,\ i = 1, 2 \ldots N \tag{28}$$

Those AND gates such as 20 and 21 in FIG. 15, for instance, that are negatively controlled from their random series $Z_i$, will generate output series $Z_i'$ with pulse probabilities $1 - p_i$. The pulse events in the output series $Z_i'$ within a given simultaneous trigger time are mutually exclusive. Only that AND gate may issue a random decision which at that time has been precisely activated by shift register 19. On these assumptions, the disjunctively combined series $Z_i''$ provide a resultant series Z at the OR gate 22, with a pulse probability $p(Z{:}=1)$ of Eq. (29):

$$p(Z{:}=1) = p = \frac{\sum_{i=1}^{N} \text{sign}\ (p_i) p_i}{N} + \frac{n}{N} \tag{29}$$

where sign $(p_i)$ denotes the sign of $p_i$ and is negative for those *i*'s indicating inverted series $Z_i$. This inversion occurs in the form of the previously mentioned negative control of an AND gate. The magnitude n indicates the number of inverted series and evidently must $0 \leq n \leq N$. Thus FIG. 15 provides a circuit arrangement allowing execution of an arbitrary number of addition or subtraction operations and with a constant circuit modulation range with respect to the number of operators.

Figure 16B:
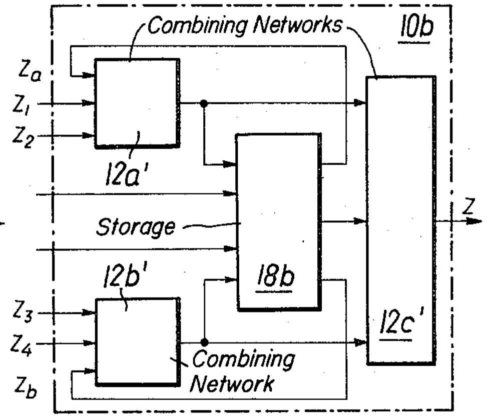
Figure 16C:
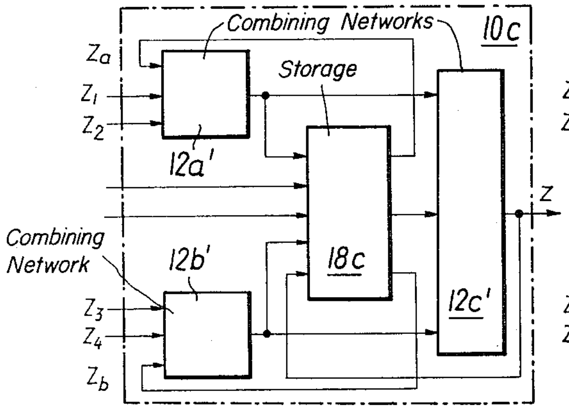
Figure 16D:
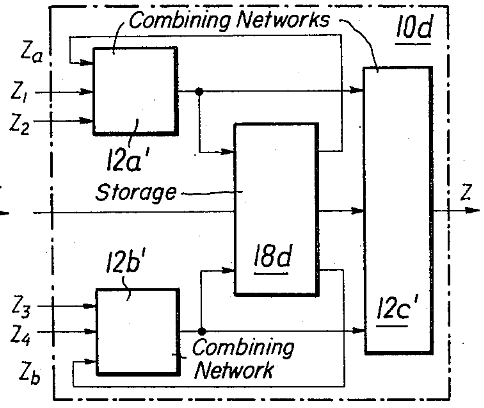
Figure 16E:
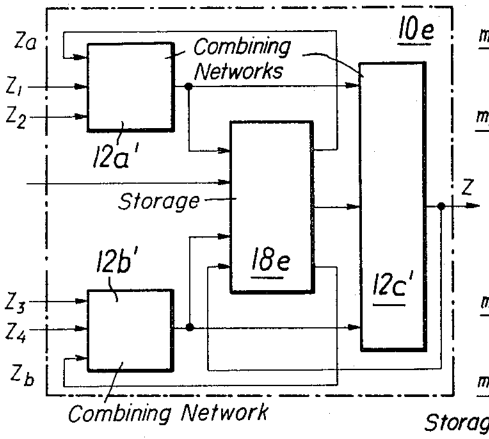

FIGS. 1*a* through 15 show fundamental circuits and variations and signal processing. The fundamental computational circuits provide binary pulse sequences with the properties of relative frequencies of occurrences corresponding to the fundamental computational results. The results of these fundamental computational operations may be combined and processed into complex results. This often requires series processing of input, parameter and output data as well as interim results and therefore temporary storing. Therefore the combining networks are provided with storage facilities that in turn may be controlled from an electronic programming input unit. FIGS. 16*a* through 16*e* show simple illustrations for the control of such storages 18*a* through 18*e*. Depending on the tasks to be solved, the control units may be any computational circuit from FIGS. 1*a* through 15. Operational use of such storages may take place in five different main forms:

b. input and output data storage must properly distribute externally fed or internally generated data to the computational and peripheral units. The data fed in may be meant for immediate processing or for conversion into other storage and computational units. Similar considerations apply to the output data, which may serve either as results or as information to be transduced by an output instrument. In both cases the storage is provided with input and output domains that will store the incoming or outgoing data for various lengths of time, usually short ones. Illustrations of such storage units in operation are shown in FIGS. 16*b* and 16*c*, where the storage 18*b* or 18*c* is also provided with a programming control besides an external data control for the fulfillment of the tasks described.

c. temporary storages are used to store data being processed and also partial results. Usually separate and fixed domains are provided for that purpose in such storage devices. The interim data are fed to the computational units for further processing. In the simplest case, such an intermediate storage may be used as in FIG. 16*d*.

d. Parameter storages are required for frequently used data such as constants or tabular values. These parameter data are constantly available and may be called out for a predetermined program and fed to the computational works. FIG. 16*e* shows a simple illustration of a parameter storage. Storage 18*e* is provided with an electronic programming control determining the data storing or read-out evolution according to the tasks at hand.

e. Lastly, a storage may be used as a data file. The task of such is making available large data contents. One must add that in such cases external storages are made use of and the storage proper will be supplied with just the relevant data for that time from the external one, there being constant and timely data exchange.

In summary, the invention's computational circuits may be complexly combined, so that for any arbitrary combination of the fundamental computational operations for signals and computational values, small digital and hybrid computers may be assembled, and this also applying to the transforms of the signals and computational magnitudes. According to the task and kind of operation, these computers may work in real time or otherwise.

I claim:

1. A circuit arrangement for carrying out computational operations for mathematical or physical magnitudes or for signals, which will be converted into electrical magnitudes by means of transducers, comprising threshold signal generators having output signals of predetermined relative amplitude frequencies, threshold-controlled comparison and decision units which compare said physical or electrical magnitudes with said output signals of said threshold signal generators and in response thereto produce at their outputs logic O–1 decisions, a computationally adaptive configuration network, the outputs of said comparison and decision units being connected to inputs of said computationally adaptive configuration network, said computationally adaptive configuration network having storage means and operable for configurating the logic 0–1 sequences of said comparison and decision units to a resulting O–1 sequence forming the output of said configuration network, the relative pulse or pulse duration frequency of said configuration network output being proportional to the computational result, and an output unit driven by said configuration network output for displaying the computational results in analogue or digital form.

2. A circuit arrangement according to claim 1 including at least one transducer for converting a signal into an electrical magnitude, and wherein said at least one transducer comprises an analogue summing circuit.

3. A circuit arrangement according to claim 2 including an additional transducer comprising an inverter.

4. A circuit arrangement according to claim 1 wherein the storage means of said computationally adaptive configuration network comprises programming control storage.

5. A circuit arrangement according to claim 4 including an additional storage means which is adapted for external data control.

6. A circuit arrangement according to claim 1 wherein at least one of said output units includes a time-averaging device for the analogue output of its computational results.

7. A circuit arrangement according to claim 6 wherein said time-averaging device comprises an RC network.

8. A circuit arrangement according to claim 1 wherein at least one of said output units comprises a pulse counter for the digital output of its computational results.

9. A circuit arrangement according to claim 8 wherein said pulse counter is adapted for forming frequency ratios.

10. A circuit arrangement according to claim 8 wherein said pulse counter is an electronic counter.

11. A circuit arrangement according to claim 1 wherein at least one of said threshold-controlled comparison and decision units comprises an ergodic converter.

12. A circuit arrangement according to claim 11 wherein said ergodic converter is an amplitude-discriminator.

13. A circuit arrangement according to claim 1 wherein at least one of said comparison and decision units comprises a synchronizing generator.

14. A circuit arrangement according to claim 12 wherein said ergodic converter is a keyed amplitude discriminator.

15. A circuit arrangement according to claim 13 wherein at least one comparison and decision unit comprises a scanning network.

16. A circuit arrangement according to claim 15 wherein the input of said scanning network is connected to said output of the ergodic converter.

17. A circuit arrangement according to claim 15 wherein the input of the ergodic converter is connected to the output of the scanning network.

18. A circuit arrangement according to claim 15 wherein said scanning network is controlled by one of said threshold signal generators.

19. A circuit arrangement according to claim 1 wherein at least one of the threshold signal generators comprises a scanning network and a synchronizing generator.

20. A circuit arrangement according to claim 1 wherein the output signal from at least one of the threshold signal generators is a periodical signal.

21. A circuit arrangement according to claim 20 wherein the periodic signal from the output of at least one of the threshold signal generators is provided with a spectral frequency incommensurate with the frequencies of the input signals of the circuit arrangement.

22. A circuit arrangement according to claim 20 wherein the relative amplitude frequencies of occurrence of the output signals of the threshold signal generators correspond to the transform to be used for the input signals of the circuit arrangement.

23. A circuit arrangement according to claim 1 wherein at least one of the threshold signal generators is a saw-tooth generator.

24. A circuit arrangement according to claim 1 wherein at least one of the threshold signal generators is a stochastic generator.

25. A circuit arrangement according to claim 24 wherein the amplitude spectrum or distribution function of the output signals of the stochastic threshold signal generators correspond to the transforms of the input signals to the circuit arrangement.

26. A circuit arrangement according to claim 24 wherein at least one output signal of the stochastic threshold signal generators shows a constant amplitude spectrum.

27. A circuit arrangement according to claim 24 wherein the output signal of the threshold signal generator is statistically independent of the input signal of the associated comparison and decision unit.

28. A circuit arrangement according to claim 1 wherein at least one of the threshold signal generators is provided with outputs where the threshold signal potential appears in ordinary as well as in inverted form.

29. A circuit arrangement according to claim 1 wherein said configuration network comprises logic networks.

30. A circuit arrangement according to claim 29 wherein the logic networks are triggered networks.

31. A circuit arrangement according to claim 29 wherein said configuration network comprises at least one storage means and that at least one of the storage means output signals is fed back as an input signal to a logic network.

32. A circuit arrangement according to claim 31 wherein the output signal from at least one logic network acts as the input signal of at least one storage means.

33. A circuit arrangement according to claim 29 wherein the configuration network comprises a synchronizing generator.

34. A circuit arrangement according to claim 33 wherein said configuration network contains at least one scanning network.

35. A circuit arrangement according to claim 34 wherein the output of at least one scanning network is connected with the input of a logic network.

36. A circuit arrangement according to claim 34 wherein the output of at least one logic network is connected to the input of a scanning network.

37. An arrangement in accordance with claim 1 including at least two threshold-controlled comparison and decision units and at least two threshold signal generators and including a common configuration network.

38. An arrangement according to claim 37 wherein only two threshold signal generators are provided for the entire arrangement.

39. An arrangement according to claim 37 wherein the number of threshold signal generators corresponds to the number of the input signals of the entire arrangement.

40. An arrangement according to claim 37 wherein the common configuration network comprises time-averaging devices and differential amplifiers, where the inputs of the differential amplifiers are connected to the outputs of the time-averaging devices and where the output potentials of the differential amplifiers are fed back as threshold signal potentials.

41. An arrangement according to claim 37 wherein the common configuration network comprises time-averaging devices, differential amplifiers and reference-sources, where one of the inputs of at least one differential amplifier is connected to the output of a time-averaging device and where the other input is connected to the output of a reference source.

42. An arrangement according to claim 37 wherein the configuration network comprises a regulating circuit, the setting or adjusting magnitude of which is fed back to a comparison and decision unit.

43. An arrangement according to claim 37 wherein the configuration network comprises a regulating circuit, of which the setting or adjusting magnitude is fed back to two comparison and decision nits.

44. An arrangement according to claim 37 wherein said configuration network comprises two regulating circuits, of which two adjusting or setting magnitudes are fed back, the first to one, the second to two different comparison and decision circuits.

* * * * *